United States Patent [19]

Szabo et al.

[11] 4,313,069

[45] Jan. 26, 1982

[54] MOUNTING FOR THERMAL PROTECTOR USED IN DYNAMOELECTRIC MACHINE STATOR WINDINGS

[75] Inventors: Arthur D. Szabo, Lima; David Stemen, Bellefontaine, both of Ohio

[73] Assignee: Westinghouse Electric Corp., Pittsburgh, Pa.

[21] Appl. No.: 124,688

[22] Filed: Feb. 26, 1980

[51] Int. Cl.³ .............................................. H02K 11/10
[52] U.S. Cl. ................................................. 310/68 C
[58] Field of Search ..................... 310/68 R, 68 C, 71; 318/783, 806, 781, 782, 221 C, 221 H; 361/25–27, 41; 174/138 G

[56] References Cited

U.S. PATENT DOCUMENTS

| | | | |
|---|---|---|---|
| 3,319,096 | 5/1967 | Eberhart et al. | 310/68 C |
| 3,875,439 | 4/1975 | Roach | 310/68 C |
| 4,132,913 | 1/1979 | Lautner et al. | 310/68 C |
| 4,186,318 | 1/1980 | Anderson | 310/68 C |
| 4,203,045 | 5/1980 | Buchanan et al. | 310/68 C |

FOREIGN PATENT DOCUMENTS 63837  9/1948  Netherlands ............... 310/68 C

*Primary Examiner*—Mark O. Budd
*Attorney, Agent, or Firm*—G. H. Telfer

[57] ABSTRACT

The invention relates to a clamp for holding a protective device in intimate contact with the winding end turns of an electric motor. Specifically the clamp is a unitary spring member with one end secured between the motor frame and core and the other end biasing the protective device against the winding end turns.

2 Claims, 4 Drawing Figures

MOUNTING FOR THERMAL PROTECTOR USED IN DYNAMOELECTRIC MACHINE STATOR WINDINGS

BACKGROUND AND SUMMARY OF THIS INVENTION

This invention relates to thermally protected dynamoelectric machines and more particularly to improved means for holding thermal protectors in intimate thermal contact with the machine winding.

Reference is made to U.S. Pat. Nos. 3,319,096; 3,875,439; and to copending application Ser. No. 895,680, filed Apr. 12, 1978 now U.S. Pat. No. 4,203,045 issued May 13, 1980, and assigned to the present assignee, for background and disclosure of alternative means for mounting a thermal protector in intimate thermal relation with the winding of a dynamoelectric machine such as a fractional horsepower motor. Despite the availability of techniques that have previously been disclosed, there remains a desirability of having a thermal protector clamp offering a combination of features including ability to withstand a lateral pulling force, as is required in a fifteen pound pull test on thermal protector of a motor characterized by having open or removable end bells in order to secure Underwriters Laboratory's listing, while at the same time permitting use of the same thermal protector clamp on motors that may have a variation in the bulk or volume of the winding with which the thermal protectors are associated. Additionally, it is of course highly desirable that any such clamp be both economical and reliable in use and that it may be inserted by a simple assembly operation not entailing any high degree of expensor operator skill.

Motors with thermal protector clamps in accordance with the present invention achieve these multiple objectives. The clamp comprises a unitary metallic spring member that has a first portion engaging the protective device and forcing, by spring biasing, the protective device against the winding end turns while a second portion is disposed between the motor frame and the stator core and is a substantially flat member with, however, a pair of pointed lances extending toward and in engagement with the stack of laminations of the core on the surface of the stack on each side of the cleat member employed for securing the laminations together while the other surface of the second portion bears against the machine frame.

The clamp can be formed from a flat member of spring steel bent to provide the referred to portions. The first portion for holding the protector is at an angle in relation to the second portion that is inserted between the core and the frame and between the two portions is a spring portion which provides the resiliency that permits applying the clamp to protectors on various motors with a fairly consistent pressure of the protector against the winding although the winding bulk may differ. Additionally, the assembly operation is made simple by the fact that it is merely necessary that the clamp be inserted in the location where a slot or recess exists in the core and the frame as is provided by the cleating feature which is common to many fractional horse power motors. The lances are simple distended points from the principal portion of the clamp that is so inserted and permit relatively easy entry but difficult or impossible disassembly of the clamp from the core and frame structure.

The spring steel clamp is essentially unbreakable and may be economically formed to its desired configuration without requiring a high degree of precision in its formation or in its assembly with the thermal protector to the core and frame. It is therefore believed that the invention provides a simple and economical arrangement for maintaining the thermal protector in its desired location on the winding.

DESCRIPTION OF THE PREFERRED EMBODIMENT

Figure 1A:
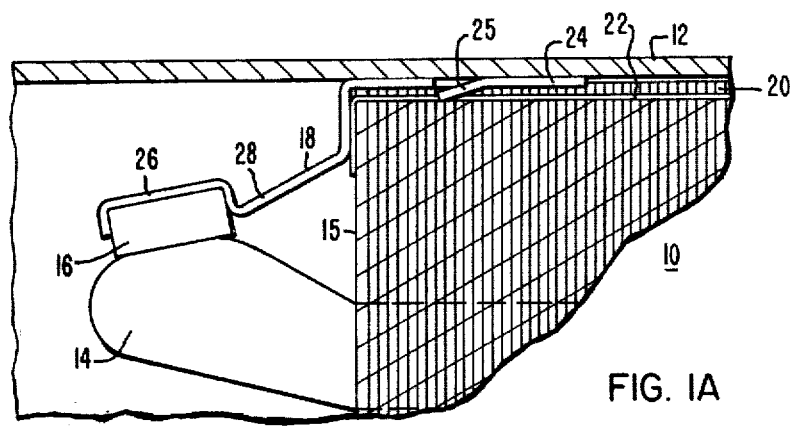
FIG. 1A is a partial longitudinal sectional view of an embodiment of the present invention.

The invention as generally illustrated in FIG. 1A comprises a dynamoelectric machine such as a fractional horse power motor whose stator core 10 comprises a stack of laminations contained within a frame 12. The stator core 10 has a winding 14 disposed therein in a usual manner whose end turns extend from the end face 15 of the core 10 and against which a thermal protective device 16 is held in intimate contact in accordance with this invention by the thermal protector clamp 18.

Figure 1B:
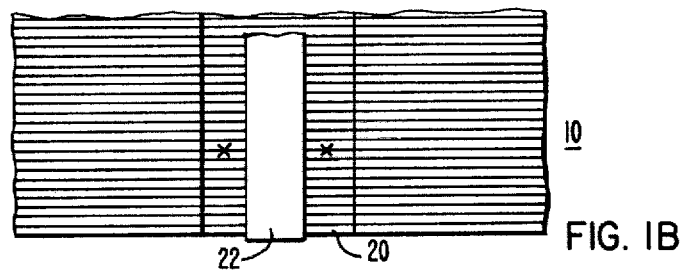
FIG. 1B is a partial plan view of a portion of the apparatus of FIG. 1A.
Figures 2A, 2B:
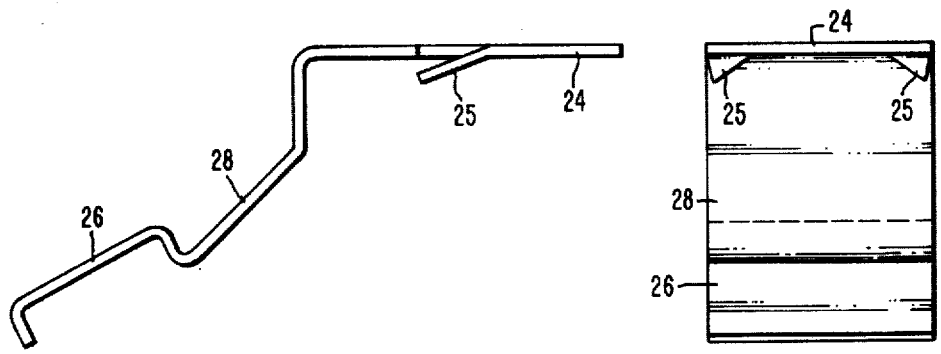
FIGS. 2A and 2B are respectively side and front elevation views of a clamp member employed in the present invention.

The stator core 10 is such that the stack of laminations is provided with a slot 20 for cleating the laminations together by cleat 22 (FIG. 1B). This recess 20 runs along the outer periphery of the laminations between it and the frame. This slot wider than the core cleat 22 that runs within it and is utilized for inserting a portion 24 of the protector clamp 18, as particularly shown in FIG. 2A, which is a generally flat portion having distended lances or points 25 that bear against the outer surface of the lamination stack 10 on each side of the cleat 22 and dig into the edges of laminations to securely hold the clamp in position. FIG. 1B shows at X the locus of points at which the lances 25 may be located when the clamp 18 is in position.

The thermal protector clamp moreover includes a portion 26 that is a generally cup shaped portion that generally conforms to the outer configuration of the thermal protector 16 itself and holds the protector in place. The thermal clamp 18 is joined by a spring portion 28 that extends angularly down from the portion 24 between the core and frame to the portion 26 holding the thermal protector. The spring portion 28 ensures that a reliably consistent pressure is applied by the protector against the winding.

In contrast with past techniques some of which have used an insulating member as the thermal clamp, such as that of U.S. Pat. No. 3,319,096, the present invention improves by providing a relatively resilient member that is unbreakable and can hold against the winding without requiring any tightly controlled displacement between the end turns of the winding and the frame.

Variation in the bulk of the winding occurs because various amounts of wire used in the winding of different motors so that a rigid or relatively rigid clamp could not be used with various motors in which the windings differed or some would be susceptible to being loose on the winding and not provide reliable heat transfer from the winding to the protector. Additionally, a smooth insulating rigid member does not provide a surface for holding it against the laminations and where the stack of laminations is cleated there are no rough lamination edges which can hold an insulative cane element such as that disclosed in U.S. Pat. No. 3,319,096.

The apparatus of the above-mentioned copending application requires a clamp element secured directly between the frame and the end windings. The present invention provides more positive retention and further flexibility as far as the use of the clamp member with motors having end windings of varying bulk. Similarly, where as the clamp member of U.S. Pat. No. 3,875,439 is inserted between the core and the frame, it is essentially the case that it is designed to hold the thermal protector adjacent one end face of the core so that the sensing means is between the peripheral surface of the core and the radially inward end turns. Also, it does not utilize gripping elements bearing against the edges of the stack of laminations. In accordance with this invention the spring biased thermal protector portion may extend away from the core end face.

Tests have reliably shown that a fifteen pound pull test is adequately passed by the apparatus in accordance with the present invention and that otherwise it achieves the objectives set out in the background as to reliability and simplicity in use.

We claim:

1. A dynamoelectric machine comprising: a frame; a stator core member supported in said frame, said core comprising a plurality of stacked laminations cleated together by a cleat member disposed within a recess that runs along the outer periphery of said laminations; a winding disposed in said core and having end turns extending from said core; a thermally responsive protective device disposed against said winding end turns; a clamp for holding said protective device in intimate contact with said winding end turns, said clamp comprising a unitary metallic spring member having a first portion engaging said protective device and spring biasing said protective device against said winding end turns and a second portion disposed between said frame and said core, said second portion of said clamp having a pair of pointed lances extending toward and in engagement with said stack of laminations respectively on the surface of said stack on each side of said cleat while a major surface of said second portion, opposite the direction in which said lances extend, bears against said frame for trim retention of said clamp against a longitudinal pulling force.

2. A dynamoelectric machine in accordance with claim 1 wherein: said clamp is a flat member of spring steel bent to provide said second portion at an angle in relation to said first portion, with a spring portion therebetween.

* * * * *